May 17, 1966 J. MacRAE 3,251,141
SELF-TEACHING EDUCATIONAL DEVICE
Filed April 23, 1962
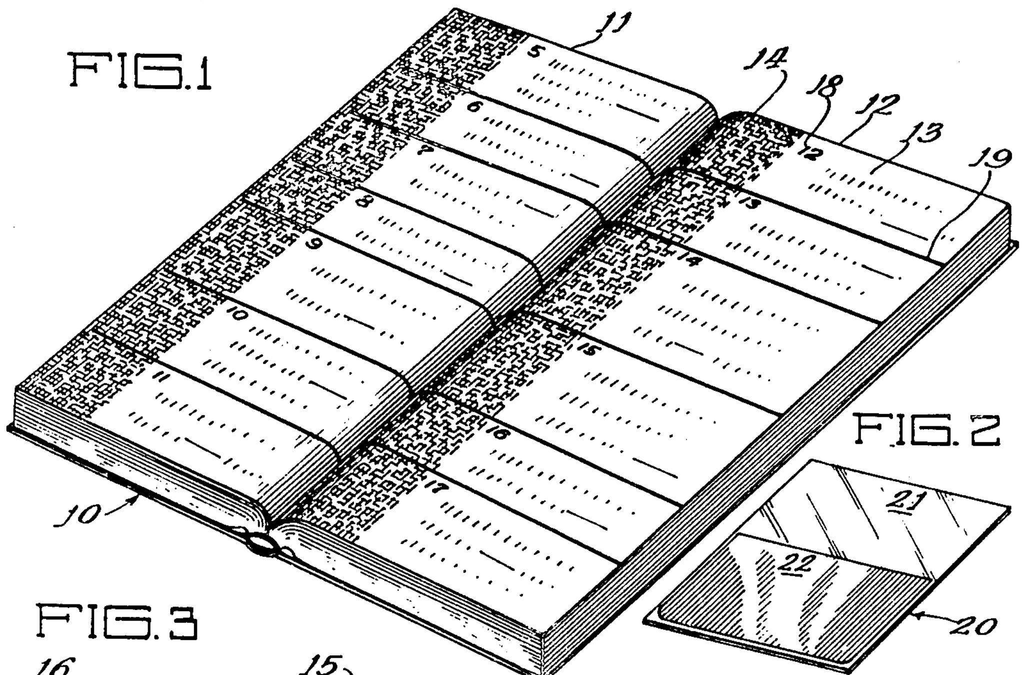
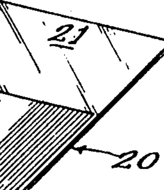
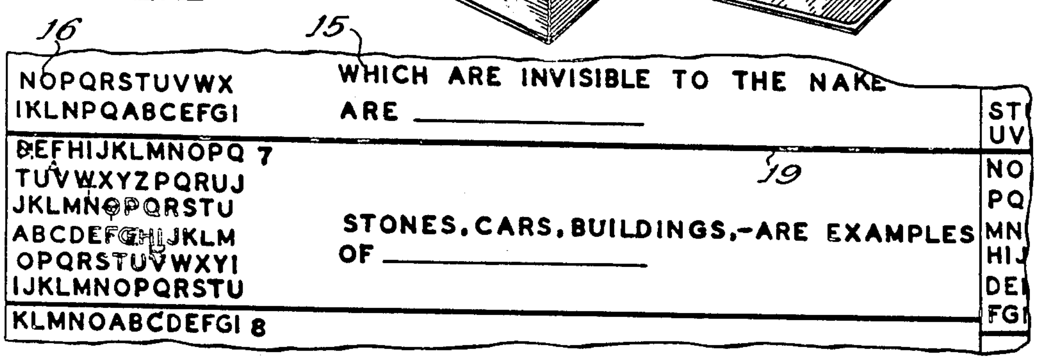
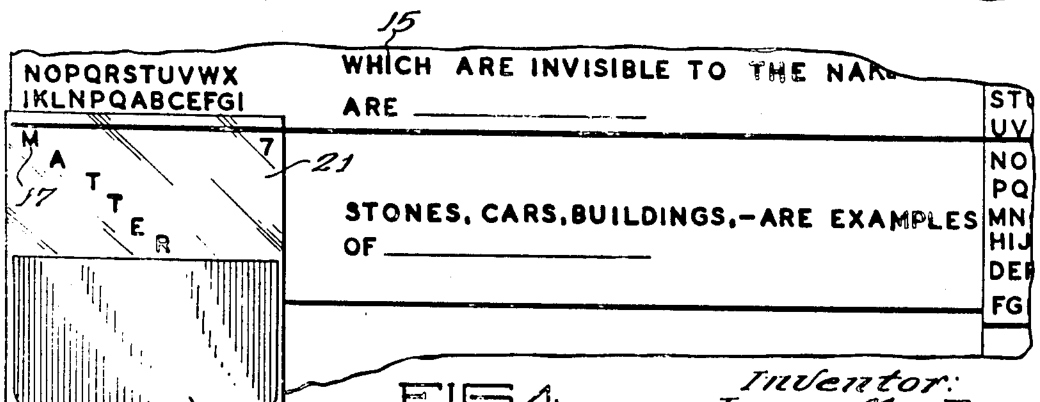
Inventor:
James MacRae
By: Hofgren, Brady, Wegner, Allen & Stellman
Attorneys United States Patent Office 3,251,141

Patented May 17, 1966

3,251,141

SELF-TEACHING EDUCATIONAL DEVICE

James MacRae, Barrington, Ill., assignor to Accelerated Instruction Methods Corporation, a corporation of Illinois Filed Apr. 23, 1962, Ser. No. 189,364
4 Claims. (Cl. 35—9)

This invention relates to a self-teaching educational device and more particularly to a device where the questions and the answers to the questions are both contained on the same side of the page and the answer is not readily discernible while the question is being read.

During the past few years the number of elementary intermediate level school pupils has increased at a startling rate when compared to the number of school teachers. This has resulted in overcrowding of the schoolrooms with the pupils receiving little or no individual instruction from the teacher and the educational caliber of the teaching remaining at best on a constant level. Since this trend is likely to continue and recent statistics indicate that the number of teachers being trained at the present time will not be able to handle the future enrollment in the schools, one method of maintaining and even improving the standard of education under these adverse conditions is to rely heavily upon self-teaching educational devices. This approach allows the pupil to learn the basic fundamentals of the major courses without heavy reliance and dependence upon an instructor. This method also permits gifted students to advance at an accelerated rate as the talented pupils can set their own pace and do not have to wait while the rest of the class catches up to them.

Basically, a self-teaching educational device is a book or other educational media which contains questions and answers to the questions so that the pupil can read the question and then, after thinking about the answer, look up the answer to see if he was correct. The self-teaching educational devices on the market at the present time, however, even though they are desirable as a means of teaching, have some disadvantages. For one thing, if the answers are not hidden or concealed in some manner, there is a natural tendency, especially with the average or below average student, to peek at the answers without spending much time with the questions. Also, if the answers are not on the same page with the questions, there is a constant turning of pages which is distracting to the pupils. The invention of this application obviates the above disadvantages.

It is therefore the primary object of this invention to provide a new and improved self-teaching educational device.

It is another object of this invention to provide such a device wherein the questions and the answers to the questions are contained on the same page and the answers are readily discernible while the question is being read.

It is a further object to provide a transparent means for differentiating between a camouflaging design and the answer so as to allow easy reading of the answer.

The invention is illustrated in a preferred embodiment in the accompanying drawings, in which:

FIGURE 1 is a perspective view of the self-teaching educational device of this invention in book form and showing the relationship between the question portion of the page and the camouflaging design portion of the page;

FIGURE 2 is a perspective view of the colored slider used to differentiate between the camouflaging design and the answer;

FIGURE 3 is an enlarged fragmentary plan view of a page showing the question portion and the camouflaging design portion; and FIGURE 4 is an enlarged fragmentary plan view of a page showing how the use of the colored slider blots out the camouflaging design and allows easy reading of the answer.

Referring now to the drawings the self-teaching educational device is shown generally at 10 and may be marketed in many forms, such as an individual sheet, a pad, or as shown in FIGURE 1, a book. The book illustrated in FIGURE 1 has a number of pages bound together, each page having a front surface and a back surface, with the back surface of a page being illustrated generally at 11 and the front surface of a page being illustrated generally at 12. Each page is complete within itself and has a question portion 13 and a camouflaged answer portion 14. As shown in FIGURES 3 and 4, marking means 15 set forth a legible question or other response eliciting means, such as a sentence with a word missing, in the question portion 13 of the surface, and a plurality of scrambled marks 16 define a camouflaging design in the answer portion 14 of the surface. The camouflaging marks 16 can be a group of numbers or miscellaneous figures or as shown in the drawing, a series of letters. For clarity of illustration in the drawing, the marks are shown spaced apart and in straight lines but it should be understood that the marks can also be superimposed upon one another to completely cover the answer portion and thereby more effectively conceal an answer 17 which is underneath the camouflaging design. Additionally, the marks can be inverted or reversed or positioned longitudinally or diagonally on the answer portion of the surface, the main purpose being to conceal the answer 17. To complete the surface, numbers, indicated at 18, index the questions, and dark lines 19 running laterally across the surface of the page divide and separate the questions.

A slider generally shown at 20 in FIGURE 2 having a transparent portion 21 and a dark portion 22 is preferably used for differentiating between the camouflaging design and the answer so as to allow easy reading of the answer. The answer is almost completely obliterated and camouflaged by the scrambled letters 16 except when the transparent portion of the colored slider is positioned over the camouflaging design portion as shown in FIGURE 4. As this time the answer is made to stand out pronouncedly. It is preferable to have the scrambled letters in a bright color, such as red, orange or the like, and the answer in a grey or neutral color with the transparent portion 21 of the slider of such a color that it blots out the color of the scrambled letters and thereby allows easy reading of the answer. In practice it has been found that the combination of red scrambled letters, a red transparent slider, and a grey answer have worked out very satisfactorily. The dark portion 22 of the slider can be used to cover up the camouflaging design portion associated with the question being read so that the student while reading the question will not be tempted to look over and try to find the answer to the question. Thus, it is readily apparent that the camouflaging marks effectively conceal all the answers and the colored slider can be used to alternately completely cover up an answer or reveal an answer.

As described above the student preferably starts at the top of the page with the dark portion of the slider covering the camouflaged answer portion opposite the first question and reads the question. After the student has written down an answer in the question portion of the surface or has an answer in mind he can check his answer by sliding the slider downwardly to position the transparent portion of the slider over the camouflaging design in the corresponding answer portion of the surface. The slider, which is guided by the student's left hand, remains in this position and the following question is read. After the question has been read and an answer is desired, the slider is moved downwardly on the page to reveal the answer to the question which has just been read. In this manner it is possible to read the questions on one surface and find their corresponding answers, and then go on to the next surface. The book shown in FIGURE 1 is so designed that the answers are always somewhere on the left-hand side of the surface so that the slider is always kept in the left hand the pages can be easily turned with the right hand without any delay. This arrangement is of particular benefit to the majority of students who are right-handed as the layout of such surface allows to the students to write down an answer, check the answer, and turn the page without setting the pencil and/or slider down. Accordingly, this arrangement saves time and does not disrupt the train of thought of the students by requiring needless extra motion.

The foregoing detailed description is given only for clearness of understanding and no unnecessary limitation should be understood therefrom for some modification will be obvious to those skilled in the art.

I claim:

1. A device for use in selectively indicating information, comprising: means defining a surface having a first appearance; means on said surface having a second, legible appearance differing from said first appearance for indicating the information; means having a third appearance differing from each of said first and second appearances for camouflaging the indicating means to render the information visually indeterminable; and control means for selectively and repeatedly making the observable appearance of said surface similar to the observable appearance of said camouflaging means and permitting it to differ therefrom to permit controlled visual determination of the information.

2. A device for use in selectively indicating information, comprising: means defining a surface having a first appearance; means on said surface having a second, legible appearance differing from said first appearance for indicating the information; means having a third appearance differing from each of said first and second appearances for camouflaging the indicating means to render the information visually indeterminable; and control means for selectively repeatedly making the observable appearance of said surface similar to the observable appearance of said camouflaging means and permitting it to differ therefrom to permit controlled visual determination of the information, said information indicating means having a preselected first color, said camouflaging means having a second color different from said first color, and said control means comprising a transparent member having a color similar to said second color.

3. A device for use in selectively indicating information, comprising: means defining a surface having a first appearance; means on said surface having a second, legible appearance differing from said first appearance for indicating the information; means having a third appearance differing from each of said first and second appearances for camouflaging the indicating means to render the information visually indeterminable; and control means for selectively repeatedly making the observable appearance of said surface similar to the observable appearance of said camouflaging means and permitting it to differ therefrom to permit controlled visual determination of the information, said information indicating means having a gray color, and said camouflaging means having a bright color.

4. A device for use in selectively indicating information, comprising: means defining a surface having a first appearance; means on said surface having a second, legible appearance differing from said first appearance for indicating the information; means having a third appearance differing from each of said first and second appearances for camouflaging the indicating means to render the information visually indeterminable; and control means for selectively repeatedly making the observable appearance of said surface similar to the observable appearance of said camouflaging means and permitting it to differ therefrom to permit controlled visual determination of the information, said information indicating means and said camouflaging means comprising alphabetical letters.

References Cited by the Examiner

UNITED STATES PATENTS

| | | | |
|---|---|---|---|
| 1,422,527 | 7/1922 | Berger | 35—26 |
| 2,961,777 | 11/1960 | Neville et al. | 35—9 |
| 3,021,612 | 2/1962 | Palmer | 35—9 |
| 3,055,117 | 9/1962 | Berstein et al. | 35—9 |
| 3,068,010 | 12/1962 | Hagopian | 36—9 |
| 3,081,088 | 3/1963 | Kast | 35—9 |

EUGENE R. CAPOZIO, *Primary Examiner.*

LEO SMILOW, GEORGE NINAS, Jr., JEROME SCHNALL, *Examiners.*

S. M. BENDER, *Assistant Examiner.*